(12) United States Patent
Siegl (10) Patent No.: US 11,794,398 B2
(45) Date of Patent: Oct. 24, 2023

(54) PROCESS FOR PRODUCING A BLOW-MOULDED PLASTIC CONTAINER AND SUCH A PLASTIC CONTAINER

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 104 days.

(21) Appl. No.: 14/764,961

(22) PCT Filed: Jan. 30, 2014

(86) PCT No.: PCT/EP2014/051799
§ 371 (c)(1),
(2) Date: Nov. 22, 2015

(87) PCT Pub. No.: WO2014/118274
PCT Pub. Date: Aug. 7, 2014

(65) Prior Publication Data
US 2016/0144551 A1 May 26, 2016

(30) Foreign Application Priority Data
Jan. 30, 2013 (CH) .................................. 00371/2013

(51) Int. Cl.
*B29C 49/48* (2006.01)
*B29C 49/64* (2006.01)
(Continued)

(52) U.S. Cl.
CPC .............. *B29C 49/48* (2013.01); *B29C 49/12* (2013.01); *B29C 49/18* (2013.01);
(Continued)

(58) Field of Classification Search
CPC ....... B65D 1/0207; B29C 49/18; B29C 49/12; B29C 49/48
See application file for complete search history.

(56) References Cited

U.S. PATENT DOCUMENTS 3,468,443 A   9/1969  Marcus
3,956,411 A   5/1976  Uhlig
(Continued)

FOREIGN PATENT DOCUMENTS

EP   0751071 A1   1/1997
EP   0870592 A1   10/1998
(Continued)

*Primary Examiner* — Jeffrey R Allen
(74) *Attorney, Agent, or Firm* — MORRISS O'BRYANT COMPAGNI CANNON, PLLC (57) ABSTRACT

A method for producing a blow molded plastic bottle starting from a preform comprises providing a preform with a specific wall thickness distribution and a blow mold are provided, the cavity of the mold having at least one channel at the locations of the plastic bottle that are to be strengthened. Subsequently, the preform is heated in such a way that the portion of the preform that correlates with the channel of the cavity is thinned to a lesser extent during the stretching and/or blow, and an accumulation of plastics material is brought about in the channel during the main blow molding operation. A plastic container produced by this process has strengthening elements formed as at least one outwardly protruding bead of material and have a wall thickness that is at least 30%, greater than the wall thickness of a portion of the wall adjacent to the bead of material.

5 Claims, 7 Drawing Sheets (51) Int. Cl.
*B65D 1/02* (2006.01)
*B29C 49/12* (2006.01)
*B29C 49/18* (2006.01)
*B29L 31/00* (2006.01)
*B29C 49/06* (2006.01)
*B29K 105/00* (2006.01)

(52) U.S. Cl.
CPC .......... *B29C 49/6445* (2013.01); *B65D 1/023* (2013.01); *B65D 1/0207* (2013.01); *B65D 1/0276* (2013.01); *B29C 49/06* (2013.01); *B29C 2049/4882* (2013.01); *B29C 2949/072* (2022.05); *B29C 2949/073* (2022.05); *B29C 2949/074* (2022.05); *B29C 2949/078* (2022.05); *B29C 2949/0779* (2022.05); *B29C 2949/0817* (2022.05); *B29C 2949/0818* (2022.05); *B29K 2105/258* (2013.01); *B29L 2031/7158* (2013.01)

(56) References Cited

U.S. PATENT DOCUMENTS

| | | | |
|---|---|---|---|
| 4,287,150 A | | 9/1981 | Gendron |
| 4,863,046 A | * | 9/1989 | Collette .............. B29C 49/0073 |
| | | | 215/381 |
| 5,205,434 A | | 4/1993 | Brunson et al. |
| 5,455,088 A | * | 10/1995 | Deemer ................. B29B 11/08 |
| | | | 428/35.7 |
| 5,884,792 A | * | 3/1999 | Krishnakumar .... B29C 49/0073 |
| | | | 215/375 |
| 6,344,166 B1 | * | 2/2002 | Aoki ................... B29C 49/0005 |
| | | | 264/521 |
| 7,732,035 B2 | | 6/2010 | Pedmo et al. |

FOREIGN PATENT DOCUMENTS

| | | |
|---|---|---|
| JP | S62144612 U | 9/1987 |
| JP | H0752234 A | 2/1995 |
| WO | 2011056176 A1 | 5/2011 |
| WO | 2012038075 A1 | 3/2012 |

\* cited by examiner

PROCESS FOR PRODUCING A BLOW-MOULDED PLASTIC CONTAINER AND SUCH A PLASTIC CONTAINER

CROSS-REFERENCE TO RELATED APPLICATIONS

This application is a national phase entry under 35 U.S.C. § 371 of PCT/EP2014/051799 filed on Jan. 30, 2014, which claims priority to Swiss Patent Application 00371/2013 filed on Jan. 30, 2013, the entirety of each of which is incorporated by this reference.

BACKGROUND

Field of the Invention

The present invention relates to a method for producing a blow-molded plastic container and a plastic container having reinforcing elements.

State of the Art

Plastic bottles and similar containers made of plastic are produced in high quantities and, for this reason, are constantly the subject of optimization to reduce costs. For cost reasons, but also for environmental reasons, it is therefore attempted to save material. For this purpose, the required stiffness of the plastic bottles is, however, to be considered. In regard to stiffness, the efforts of technicians and designers are limited to plastic containers designed as plastic bottles having a filling volume of 50 ml to 3000 ml.

Owing to the high rigidity of the stretched PET material, PET bottles enable very thin walls between 0.1 and 0.5 mm. This high rigidity enables the filling of even bottles having very thin walls with a $CO_2$ or nitrogen overpressure without them excessively deforming. Examples for such bottles are a plurality of beer, mineral water, and soft drink applications having a $CO_2$ internal pressure, as well as a plurality of ice tea, juice or mineral water applications having a nitrogen interior pressure, in such a manner as these bottles are displayed nowadays on the store shelves of respective retailers.

In most instances, this internal pressure load structurally does not cause a problem for the cylindrical portion of the bottle. If, however, the internal pressure escapes because the consumer has opened the bottle, the bottle is structurally extremely unstable after the pressure equalization because of to the thin walls and deforms easily in the hand of the consumer.

Stiffening groove structures, which are to absorb the forces resulting from the internal pressure, result, similar to a harmonium, under the internal pressure in an expansion of the bottle. Nonetheless, these grooves are intensely used because the consumer is barely able to hold the bottle in the open state.

This internal pressure load would not be a problem for a plastic container or, respectively, a plastic bottle, having a spherical bottom; however, the bottom of a PET bottle, in order to stand firmly, is in most instances not shaped spherically.

Stiffening groove structures that are to reinforce a flat bottom are state of the art. Independent of whether a shoulder, body or bottom area of the bottle is concerned, grooves are currently the common way to reinforce bottles, even though groove structures also have disadvantages.

In order to reinforce the bottle body, ribs instead of grooves may also be introduced in those places, in which the bottle experiences the maximum load. Introducing ribs instead of grooves into a bottle is technically indeed possible via a ribbed preform, however, this enables only the production of such ribs that are easily removed from the mold. Even though this technology has already been known since 1969, it nowadays is no longer used in mass production.

In a stretch blow-molding process, a heated preform is blown into a cavity of a blow mold and, in this instance, simultaneously stretched lengthwise by a stretch mandrel. In the blowing process, first, a pre-blow is generated and this pre-blow is converted afterwards during main-blowing into the final bottle form.

The bottom of a plastic bottle has to provide for a safe position of the bottle on the one hand, and resist the pressure of carbonized beverages on the other. Different bottom molds, which achieve their pressure resistance by various structures and wall thicknesses, are known for different bottom constructions. In particular, a bottom having 5 to 7 stand footings has been established for most soft drink applications, which are typically carbonized by 4 to 10 g/l $CO_2$. Depending on the interaction between the content and equalizing pressure with the content-free head space, the bottle has, in the shaken state, an internal pressure of 2 to 6 bar at room temperature, which, however, in the non-shaken state is, by vigorously binding with the content, lowered quickly to pressures of 1 to 5 bar at room temperature.

The publication WO 2012/038075 discloses a bottom construction for a plastic bottle, including an annular edge portion designed as a standing surface, which is formed as one piece with the side wall of the bottle, and a concave bottom surrounded by the edge portion, with which it forms one piece, having radially arranged reinforcing elements. The reinforcing elements are formed by outwardly curved areas, which substantially have an equal wall thickness as the concave bottom. An essential characteristic of this bottom construction thus is that the stiffening elements at no point result in a thickening of the material, because they are merely formed by outwardly curved areas of the concave bottom section.

The publication DE-OS-1 801 368 shows a bottom for plastic bottles, which are designed for storing pressurized beverages. Various embodiments of concave bottle bottoms reinforced by ribs are disclosed. The bottles have a circular, convex edge portion and a circular middle part, and the edge portion and the middle part are connected to one another by a plurality of radially running ribs. In cross section, the ribs have the shape of a very acute-angled, isosceles triangle having a ridge located on the outside, which extends in a straight line. Producing such a bottom requires a preform, in which the bottom is already formed as a finished piece with the reinforcing ribs.

U.S. Pat. No. 7,732,035 B2 describes a bottom for a plastic bottle, which is to withstand high internal pressures. The plastic bottle has an outer, annular section serving as the standing surface for the bottle, an annular center section, and a bottom section connecting the outer annular section and the central section with each other. The bottom section is made up of concave and convex bottom sections, which are situated next to one another in an alternating manner. The concave and the convex bottom sections extend in radial direction from the central section to the outer annular portion. Stepped segments are formed in the concave bottom sections, and the first step, which is located next to the central section, has the greatest vertical height. The convex bottom sections may be equally curved in a sectional view or may have, closest to the outer annular portion, a stepped annular portion. U.S. Pat. No. 7,732,035 B2 provides no information regarding the material strengths, so that it has to be assumed that these are equally distributed in the concave and convex bottom sections.

U.S. Pat. No. 3,956,441 discloses a plastic container having inner reinforcement ribs, which are generated by a two-tiered blowing process in two different blow molds. In this instant, a preform is blown into a pre-blown preform in a pre-blowing process and is put into contact with the wall of a first blow mold, which has a plurality of concave ribs approximately in the center. In this manner, convex ribs protruding outward are forming in the pre-blown preform. The pre-blown preform is then inserted into a second blow mold having smooth surfaces and is blown up into a finished plastic container. In this second process, the convex ribs are smoothed, so that concave sections result between convex, inwardly oriented reinforcing ribs, that is, that the outer surface is smooth.

U.S. Pat. No. 5,455,088 discloses a parison for producing a blow-molded plastic bottle, the dome-like end of which is provided with a plurality of ribs arranged at a distance from one another. Valleys having a 30% lesser material thickness are located between the ribs. A thickened ring section, which is 105% and 135% thicker than the remaining area of the parison body, is located above the ribs. When inflating the parison to a bottle, the thickened ring section migrates downwards and outwards and, when the bottle is fully inflated, forms an annular standing surface having an increased material accumulation. In contrast, the ribs are extending between the standing surface and up to the vicinity of the central injection point. Owing to the special design of the parison, a reinforced bottom structure having a reduced amount of plastic is able to be achieved.

The publication JP S62 144612 discloses a parison, whose rear section having the bottom is outfitted also with the thickenings extending in the longitudinal direction of the parison. These thickenings are preserved in a respectively reduced form also when the container is completely inflated.

U.S. Pat. No. 4,287,150 describes a process, in which, first, an injection mold is provided having fine structures, for example, readable letters, worked into the surface as indentations. In the injection molding, a respective parison is then produced, which surface has the same fine structures featured as elevations. In a second process step, the parison is then blown into a container, and the blow mold is designed in such a manner that the fine structures are retained.

The publication EP-A-0 870 592 describes a method, in which, first, a parison is produced, which has first markings at the outside, for example, annular ribs. The parison is then inflated in a blow mold, which has second markings at the surface, into a blow-molded item. It may be concluded from the distance between the first and second markings from one another, whether specific criteria, for example, wall thickness, are retained.

The publication WO 2011/056176 discloses a parison that is already provided with oblong reinforcing ribs at the inside or outside. When inflating the parison, somewhat smoothed reinforcing ribs are retained at the inside or outside of the completed container.

The latest state of the art (U.S. Pat. No. 5,455,088, JP S62 144612, U.S. Pat. No. 4,287,150, EP-A-0 870 592, WO 2011/056176) has in common that parisons are used, whose walls already have a structure (thickenings, grooves).

Advantages of the Invention:

It is therefore an advantage of the present invention to provide a plastic container, which is able to withstand a high interior pressure. A further advantage is to design the container body and/or the bottom of the plastic container in a more stable manner in those areas experiencing maximum stress. A further advantage is to create a plastic container that is able to be produced by the existing production method and has the required stiffness.

SUMMARY OF THE INVENTION

These and additional advantages are achieved by a method according and by a plastic container. Advantageous embodiments of the method according to the present invention and the related plastic container are defined in the claims.

According to a first exemplary embodiment of the present invention, a method for producing a blow-molded plastic container starting from a preform is provided by the following method steps:

Providing a preform having a first wall section and a second wall section adjacent to the first wall section;

Heating the preform;

Transferring the heated preform into a cavity of a blow mold;

Pre-blowing and/or stretching the heated preform to a pre-blow; and

Main-blowing the pre-blow into a plastic container.

According to the present invention, a blow mold, whose cavity has at least one groove at a to-be-reinforced location of the plastic container, is provided. The preform is heated prior to the blowing process in such a manner that the first wall section correlating with at least one rib of the cavity when stretched or pre-blown is thinned to a lesser extent than the second wall section. When main-blowing, an accumulation of plastic material in the at least one rib results from the first wall section. The fact that the plastic is accumulated in the rib when stretch-blowing is surprising and also has not been predicted by the applied simulation programs. Rather, on the basis of simulations, it was expected that the material would thin considerably in the ribs when blowing or that the wall thicknesses of the outwardly curved areas and of the remaining bottom substantially would have the same wall thickness, such as is the case for the plastic bottle of publication WO 2012/038075 cited at the outset. The method according to the present invention has the advantage that the used preforms may have the conventional shape of smooth surfaces, that is, without any structures such as thickenings or grooves and do not already have to have—as is the case in the method of publication DE-OS-1 801 368—a bottom having the final bottom construction. A preform body may border the transfer ring and extend in the opposite direction as the neck. The preform body may form a plastic body, which is designed to receive the stored liquid, at the finished blow molded plastic container. The preform body has no structures at the outside. This means that the preform body has no protrusions or undercuts at its outside. For this reason, the preform may be produced as a one-piece cavity because the cavity does not have to be separated in order to remove the preform body. Furthermore, the interior of the preform body located opposite of the exterior of the preform body may not have structures either, thus, may be free of protrusions or undercuts. Furthermore, the interior may be designed in an oval, elliptical or circular shape. For the purposes of the present invention, oval refers to that the geometric form, which results from a cut at an arbitrary location perpendicular to the center axis of the preform body, may be crossed only in a left curve or in a right curve, in which straight sections are permissible. Hence, the geometric form has no indentations.

Wall thickness increases between the interior and the exterior of the preform body may be formed along the middle axis of the preform body with increasing distance from the transfer ring. In this way, the mandrel, around which geometric outer wall the inside of the preform body is formed, may be designed in a simple manner and does not need any inserts that change the outside wall of the mandrel at least partially, as it would be necessary, if the wall thickness of the preform body would be only partially changed. This substantially reduces the production costs for the preform and the tools producing the preform. The preform is typically an injection mold part and is, for this reason, produced from plastic material suitable for injection molding, whose main component is typically polyester. The plastic material may be, for example, polyethylene terephthalate (PET) or polyethylene furanoate (PEF). Also, the preform may be designed in such a manner that the first wall section has a first wall thickness and the second wall section has a second wall thickness, and the two wall thicknesses may be equally thick. In such a case, the first wall section and the second wall section may be fed heat quantities different from each other in an oven for heating the preform, so that when pre-blowing and/or stretching the heated preform to a pre-blow, the first wall section and the second wall section are stretched differently from each other. The second wall section is typically heated to a higher temperature than the first wall section, so that when stretching and/or pre-blowing the second wall section is stretched more in the cavity than the first wall section and, accordingly, the first wall section has a first wall thickness after stretching and/or pre-blowing, which is greater than the second wall thickness. Also, the preform may be designed in such a manner that the first wall section has a first wall thickness and the second wall section has a second wall thickness, and both wall thicknesses may be different in thickness. For this purpose, the first wall section and the second wall section may be fed the same heat quantity in the oven. When pre-blowing and/or stretching the heated preform into a pre-blow, the first wall section and the second wall section are stretched differently from each other because the first wall thickness and the second wall thickness were heated to different temperatures. Of course, preforms having different wall thicknesses may also be loaded with different heat quantities, and the first wall section is typically fed a lesser heat quantity than the second wall section.

Advantageously, a blow mold having grooves, which may have a maximum width of 10 mm, a maximum width of 7 mm or a maximum width of 5 mm, is provided. In this instance, the grooves may have a maximum depth of 6 mm, a maximum depth of 5 mm or a maximum depth of 4 mm. Grooves having such dimensions may, in a conventional stretch blowing process, produce material thickenings in the grooves, which appear in the finished product as outwardly curved material beads made out of plastic.

An advantage of the present invention is also a blow-molded plastic container, for example, an aerosol container, particularly for beverages or liquids under an interior pressure, having a container bottom, a container body connecting to the container bottom, and a neck connecting to the container body having an opening, and the neck is located substantially opposite of the container bottom. From this group of container bodies and container bottoms, at least one component has at least one reinforcing element having a first wall thickness.

According to the present invention, the at least one reinforcing element is formed as a material bead protruding to the outside, and the first wall thickness may be at least 30% greater, at least 50% or at least 70% greater, than a second wall thickness of a wall area of the component adjacent to the at least one material bead. Owing to that the wall thickness or the material strength of the at least one material bead is considerably greater than the wall thickness of the wall area laterally adjacent, a significant reinforcement of the container body and/or the container bottom is able to be achieved. Depending on the heat profile of the preform, areas of the preform specifically may be left thick when stretching as well as pre-blowing and, for this reason, specifically produce thick sections in the container body. Ribs curved similarly to the human chest have proven to be particularly pressure resistant. The material bead has at least one wall thickness that is at least 50% greater than the second wall thickness. The maximum wall thickness of the rib is to be measured at its highest point, thus, typically in the middle of the cross section of the rib.

Different from the publication WO 2012/038075 A1, in which the concave section including the areas protruding to the outside are substantially formed in an even manner during the conventional main-blowing process, material beads or ribs made out of solid material result according to the present invention.

Measuring the thickness of the at least one material bead occurs in elongated reinforcing elements of a predefined length approximately in the middle and measuring the wall thickness of the laterally adjacent wall areas occurs respectively next thereto. The wall thickness of the laterally adjacent wall areas is typically to be determined at a distance of between 2 and 10 mm next to the material bead. If a plurality of material beads are provided next to one another, then determining the wall thickness of the laterally adjacent wall areas occurs at its thinnest point, thus, typically in the middle between the material beads. Alternatively, determining the thickness of the material beads may occur in the middle third, and an average (arithmetic mean) is determined in the case of different thicknesses. Determining the material thicknesses of the laterally adjacent wall areas is carried out accordingly.

The stretch ratio may be 1.5 to 3.5, 2.0 to 3.5, or 2.5 to 3.5. The stretch ratio as intended by the present invention is the first height of the plastic container body in relation to the second height of the preform body. Height is here a one-dimensional measurement. The first height of the plastic body is, according to the present invention, the first distance between its container bottom and its underside of the transfer ring. The second height of the preform body is, according to the present invention, the second distance between its bottom and its underside of the transfer ring.

The fluids filled under pressure into the plastic container may be liquid or gaseous. Liquid fluids may be, for example, carbonized beverages such as mineral water, lemonades or beer. Gaseous fluids may be, for example, propellants for producing aerosols.

In this instance, the suggested plastic container may be produced by the suggested method.

Advantageously, the back of the material bead may have a width between 2 and 10 mm, between 3 and 9 mm or between 4 and 8 mm. Material beads of these dimensions may be generated by a respective container and/or preform design, as well as by an adapted blowing process.

Suitably, the material beads have a substantially flat back. For this purpose, the back may be, at least when transverse to the longitudinal extension of the material bead, cambered or rounded.

According to a particular embodiment, at least one material bead is provided in the middle third of the longitudinal extension of the bottle body or container. Such a material bead may significantly increase the stiffness of the bottle body.

Advantageously, the material bead may have an average thickness of 2.5 mm, of at least 3 mm or of at least 3.5 mm. Such material beads having the aforementioned thicknesses effect a specific stiffening of the plastic container wall areas outfitted with the material beads. Determining the average thickness of the material beads is carried out in that a plurality of material thicknesses along the longitudinal extension is determined and averaged.

The material bead may have in cross section the shape of a trapezoid or an oval; however, cross sections of a different geometric form, for example, a substantially circular cross section or a right-angled cross section having rounded corners, are also conceivable. At the inside of the container, the material bead in cross section may be concave or convex.

The container body and the container bottom may be connected to each other by an annular edge portion defining the standing surface.

According to one embodiment, the container bottom is substantially formed in a concave manner and has a plurality of material beads or material thickenings substantially extending in radial direction. As a function of the design of the container bottom, 3, 4, 5, 6, 7, 8, or a plurality of material beads may be provided.

Advantageously, the container bottom includes at least one concave area and at least one convex area, and the at least one convex area is formed by the material bead. The at least one material bead projects out of the surface of the container bottom. Suitably, the at least one material bead is in longitudinal section convex, that is, outwardly cambered. The at least one material bead braces the concave container bottom and, in this manner, prevents a bulging of the same under the interior pressure of the container of the fill, for example, a beverage.

A flattened or outwardly cambered area may be provided in the middle of the container bottom. In this central area, the injection point for the preform may be provided. A first annular recess is suitably provided between the outwardly cambered, such as a circular area and the at least one concave area. A second annular recess may be provided between the annular edge portion and the concave area. These annular recesses effect a non-direct force transmission to the edge areas subjected by a bending moment. Furthermore, the force applied to the (typically cambered into the direction of the container interior) container bottom may be, owing to the at least one annular recess, which may be situated between the annular edge portion and the container bottom, applied in a sprung or damped manner to the wall areas of the plastic container adjacent to the annular recess and neighboring the container bottom. It has been proven to be particularly advantageous if the container bottom is separated from the remaining plastic container by the annular recess and, hence, the annular recess is circumferentially formed. The at least one material bead formed as a reinforcement thus ends within the container bottom. A respective design of the at least one annular recess as a function of the used plastic material may achieve that the forces applied to the wall areas may not be transmitted to the concave bottom area. The annular recess viewed in cross section may be designed in a stepped manner, hence, have a plurality of annular recesses adjacent to one another.

Advantageously, a first ring section is provided between the first annular recess and an interior end of the at least one material bead, and a second ring section is provided between the second annular recess and an exterior end of the at least one material bead. These ring sections separate the at least one material bead from the annular edge portion and prevent in this manner that a deformation of the concave bottom resulting from the high interior pressure affects the standing surface. Determining the thickness of the concave area may be carried out at a distance of at least 3 mm, at least 5 mm or at least 8 mm, from the middle axis of the material bead.

A thickness of the at least one material bead may be, measured in the middle third of the longitudinal extension of the material bead, at least 40% greater, 60% greater or 80% greater, than a wall thickness of the at least one concave area.

BRIEF DESCRIPTION OF THE DRAWINGS

Exemplary embodiments of the present invention are now described in reference to the drawings.

DETAILED DESCRIPTION OF THE ILLUSTRATED EMBODIMENTS

Figure 1:
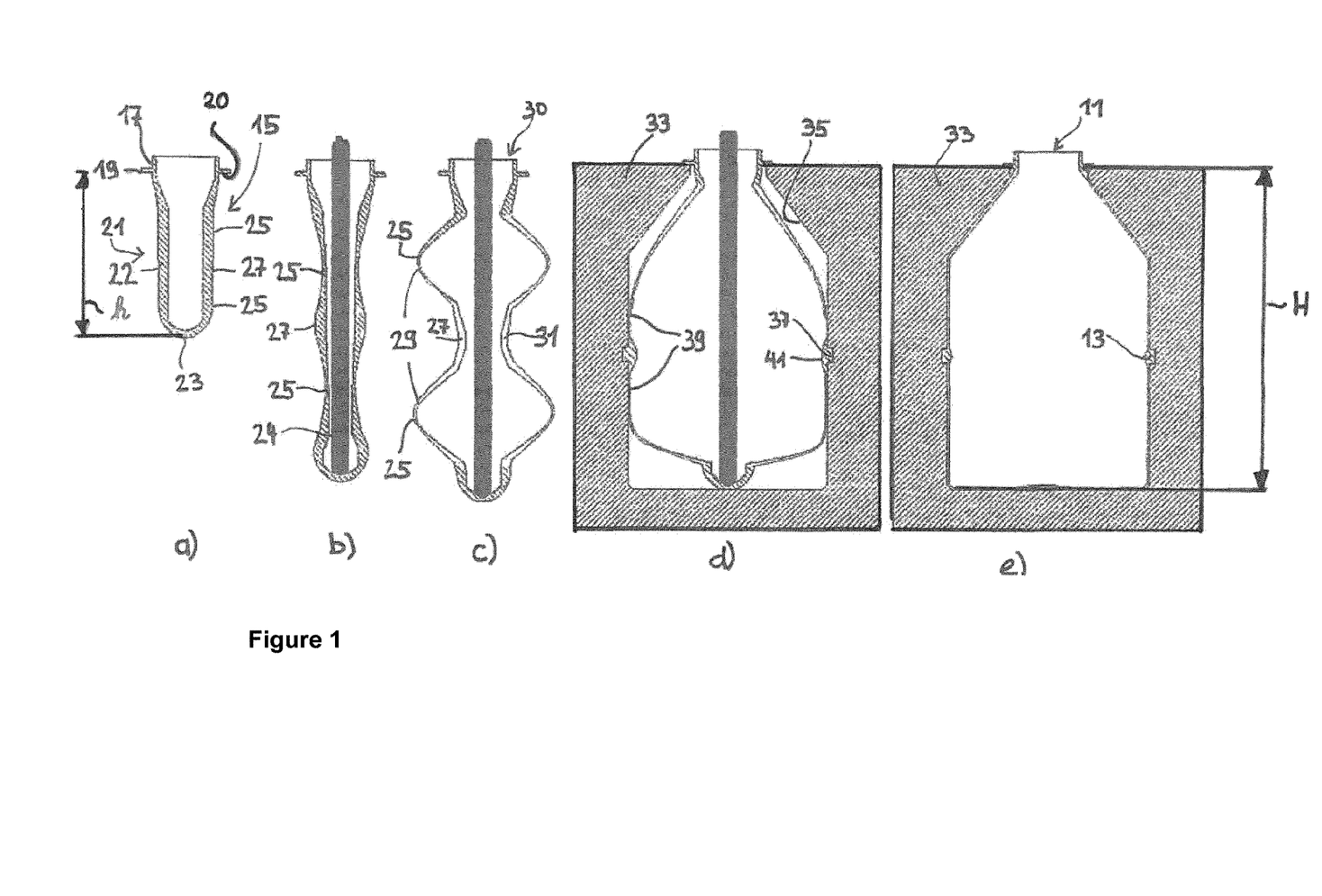
FIG. 1 shows from left to right the production process of a plastic container designed as a plastic bottle having an annular reinforcing element, which is formed as a material bead starting from a preform.

FIG. 1 shows the production process of a stretch blow-molded plastic container 11 formed as a plastic bottle having a circumferential reinforcing element, which is designed as a material bead 13. The starting point is a preform 15 having no structures on its outside, hence, no undercuts or protrusions at its outside, as it is conventionally used for producing stretch blow-molded plastic bottles 11. Preform 15 has a neck 17 having a transfer ring 19 and a preform body 21, connecting at an underside 20 of transfer ring 19, that is closed off by bottom 23. Depending on at which place in the bottle a to-be-produced reinforcement is to be formed, the preform may have different wall thicknesses. In the present case, preform 21 has a wall 22, which has a first wall section 27 having a first wall thickness and a second wall section 25 adjacent to first wall section 27 having a second wall thickness, and the first and the second wall thickness are, in an ideal case, equally thick, or the two wall thicknesses may be similar to each other, that is, that their difference in thickness may be <1 mm, <0.6 mm or <0.4 mm. Furthermore, wall 22 has a greater wall thickness than bottom 23.

Prior to the stretch blow-molding process, the material of the preform is first heated to a temperature, which lies above the glass transition temperature. For producing a bottle having an annular material bead approximately in the middle of the bottle, first wall section 27 of the preform is heated less than two second wall sections 25 adjacent to first wall section 27, located above and below. The unequal heating of preform 15 results in that during stretching by means of stretch mandrel 24 the plastic in first wall section 27 is thinned to a lesser extent than in second wall section 25, so that wall section 25 having a thinner wall and at least a first wall section 27 having thicker walls relative to wall sections 25 are provided (FIG. 1b). In this instance, when blowing a pre-blow 30, two pre-blow areas 29 leading ahead and a thick section 31 (FIG. 1c) first result, and thick section 31, vis-à-vis two pre-blow areas 29, illustrates a necking.

FIG. 1d) shows a blow mold 33 having a blow mold cavity 35, which corresponds with the form of the plastic bottle to be produced. Blow mold 33 has a circumferential groove 37 in the middle area of a container body to be produced. The material of first wall section 27 is pressed into this groove 37 during blowing. Cooled areas 39 of blow mold 33 located above and below of groove 37 cool the material in groove 37 down and immobilize said material (cooling lines not shown in the figures). Surprisingly, a first material accumulated in groove 37 may not be extruded anymore from groove 37, not even in the main-blowing process.

The first material locked into groove 37 is—though still thick-walled and hot—now no longer available for the remaining blow-molding process. A second material 41 accumulated above the first material above groove 41 is still subjected to the tensile forces and stretches further depending on cooling degree and tensile forces and, in doing so, thins, however, without in this instance being able to stretch the first material. It remains an annular material bead formed out of first wall section 27 having a significantly thicker material than second wall sections 25 adjacent to the material bead.

Creating a rib parallel to a middle axis of a container body is significantly more complex but, however, the suggested technology still makes this possible and it is particularly desirable in the container bottom.

Reference character H designates a first height. First height H of the plastic body is the first distance between its container bottom 42 and underside 20 of transfer ring 19. Reference character h designates a second height. Second height h of preform body 21 is a second distance between bottom 23 and underside 20 of transfer ring 19. The stretch ratio as intended by the present invention is first height H of the plastic container body in relation to second height h of preform body 21. The stretch ratio may be 1.5 to 3.5, 2.0 to 3.5 or 2.5 to 3.5. In the present exemplary embodiment, the stretch ratio is 2.0.

Figures 2, 3:
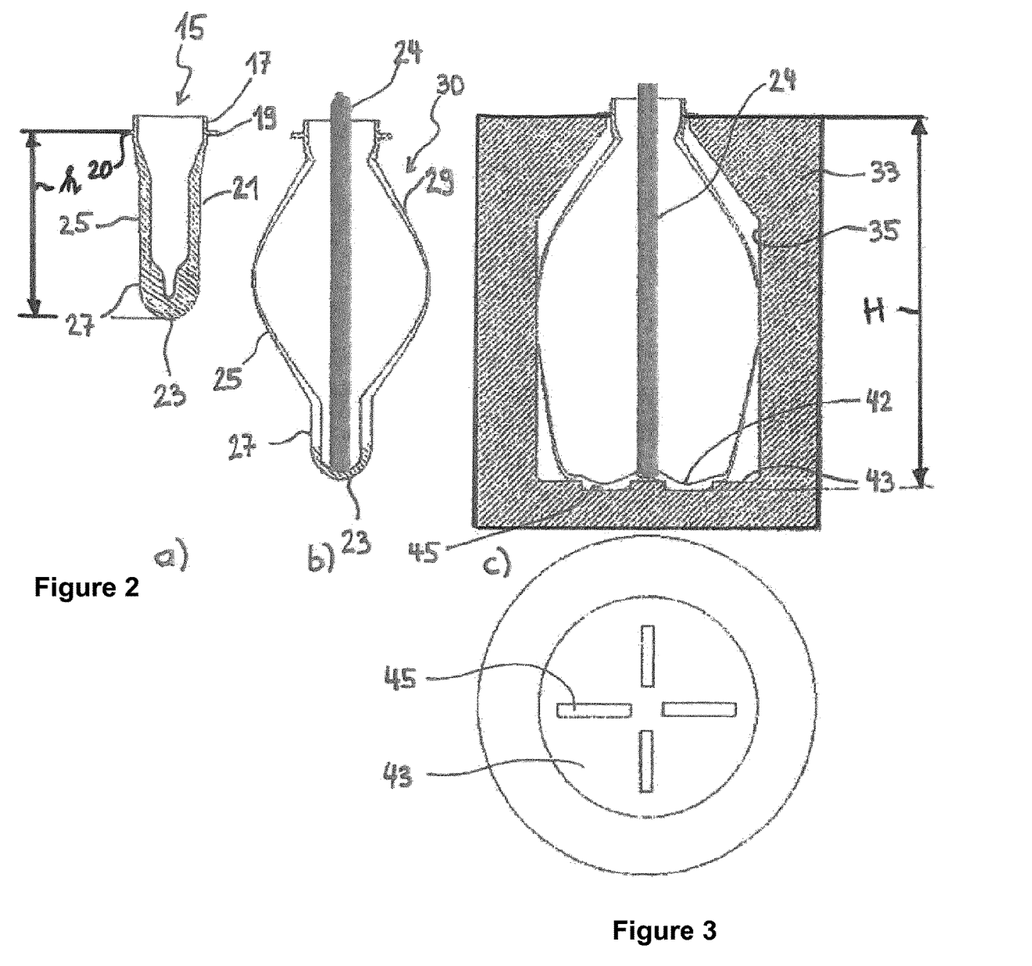
FIG. 2 shows from left to right the production process of a plastic bottle having a container bottom reinforced by material beads.
FIG. 3 shows a plan view onto the container bottom of a blow mold cavity.

FIGS. 2a) through 2c) and 3 show the production of a plastic bottle having a container body 42 reinforced by material beads or material thickenings. Blow mold 33 used for this purpose has a blow-molding bottom 43 having a plurality of radially situated grooves 45. In the exemplary embodiment shown here, an interior wall of preform 15 is designed in a stepped manner, in that second wall section 25 adjacent to transfer ring 19 is formed thinner than first wall area 27 adjacent to second wall area 25, which extends to bottom 23 of preform 15.

First, preform 15 is heated so that, when pre-blowing and stretching heated preform 15, pre-blow 30 is formed in such a manner that second wall section 25 when stretched by stretch mandrel 24 is thinned vis-à-vis first wall section 27. In this manner, pre-blow area 29 is created substantially between first wall section 27 and transfer ring 19. The heat profile to be established for heating is selected respective of the wall thickness distribution of used preform 15. During the stretch blow-molding process pre-blow 30 is expanded to the extent that the material of preform bottom 23 and first wall section 27 just fills radial grooves 45. This particularly thick-walled material may no longer be stretched out of grooves 45, while the material between the grooves is still available for the remaining stretch blow-molding process during main-blowing.

Figure 4:
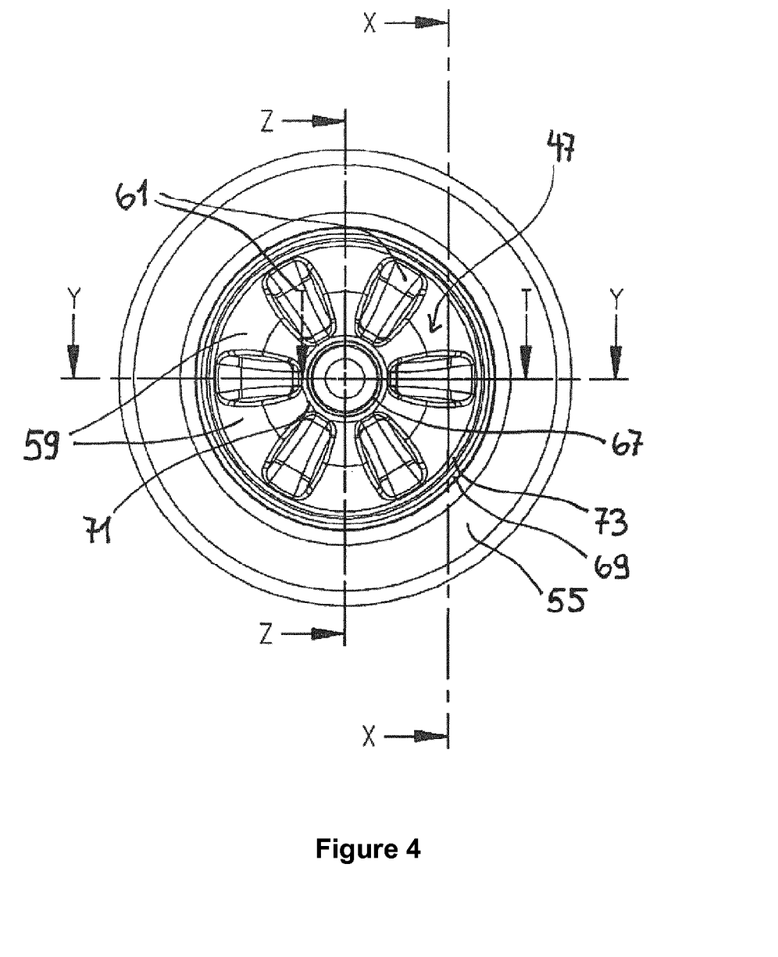
FIG. 4 shows an embodiment of a container bottom having radially situated material beads.
Figure 5:
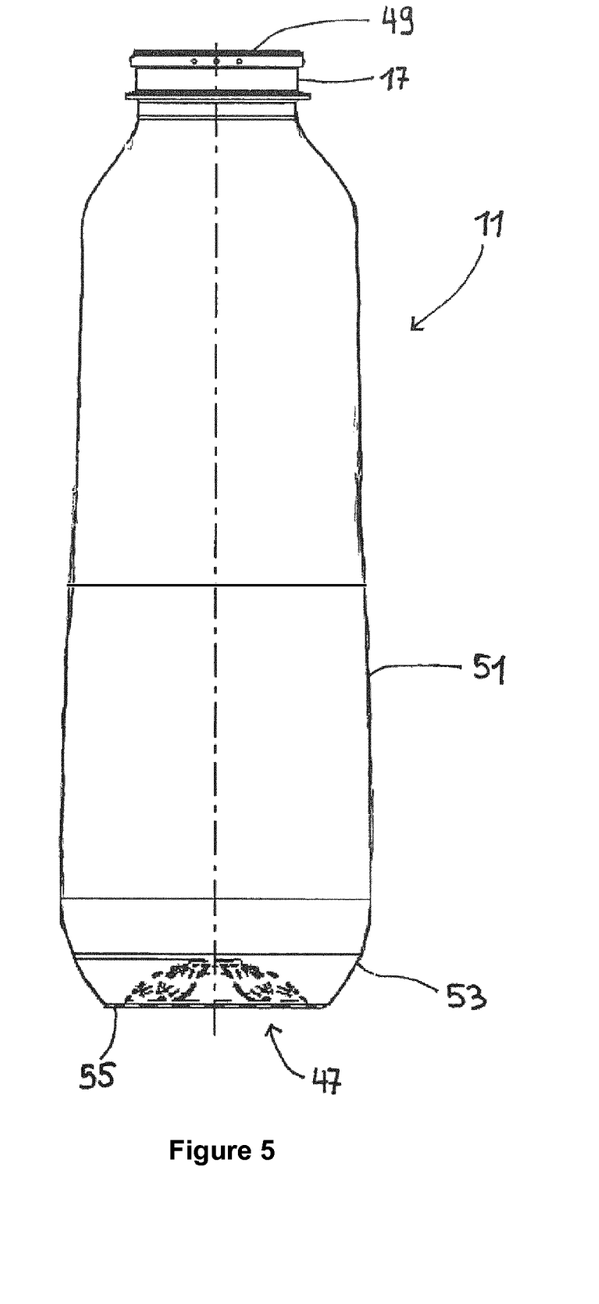
FIG. 5 shows a plastic container having a container bottom.
Figure 6:
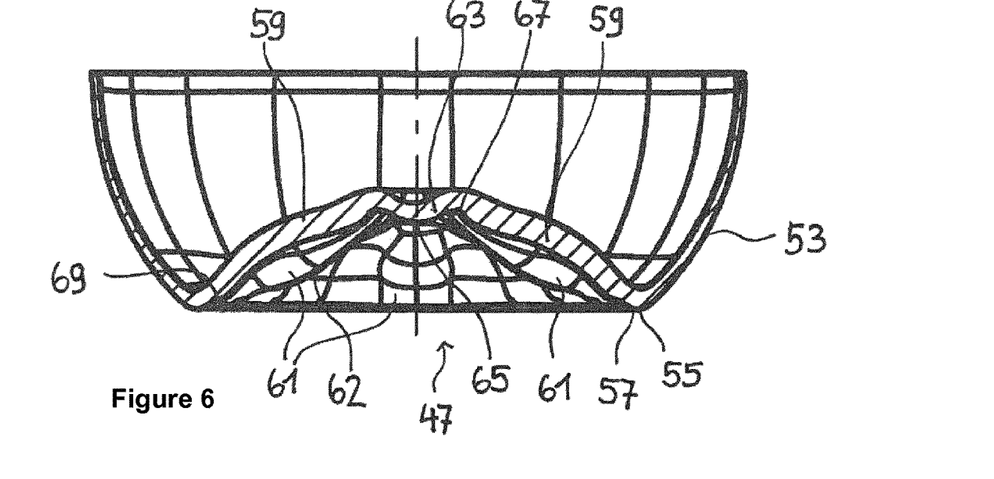
FIG. 6 shows the container bottom from FIG. 4 in a section along line ZZ.
Figure 7:
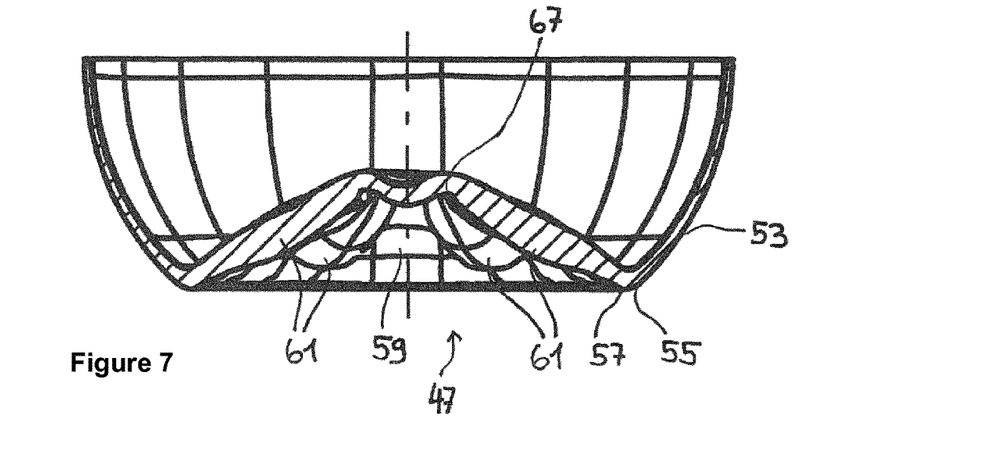
FIG. 7 shows the container bottom from FIG. 4 in a section along line YY.
Figure 8:
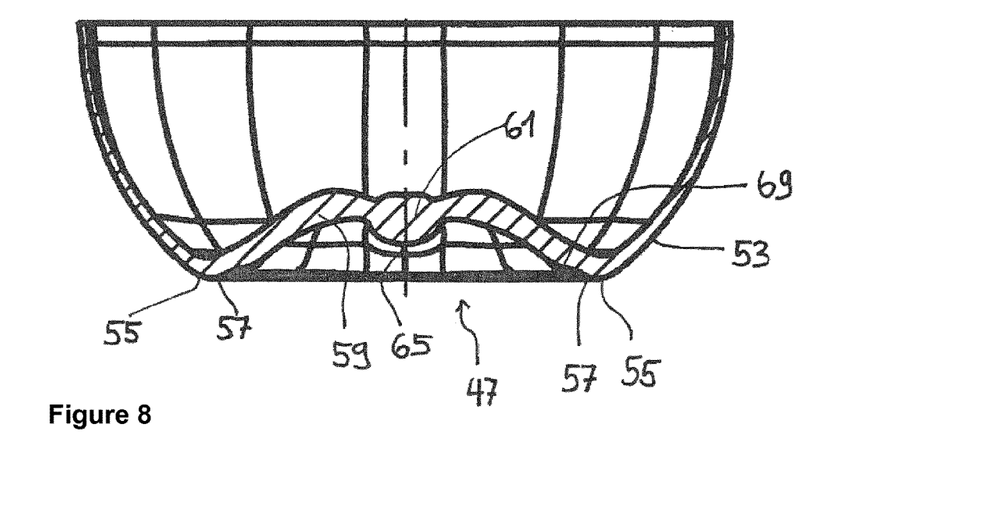
FIG. 8 shows the container bottom from FIG. 4 in a section along line XX.

FIGS. 4 through 11 show a plastic bottle 11 by means of a second exemplary embodiment of a particularly pressure-resistant concave container bottom 47, as illustrated in FIG. 4. Plastic bottle 11 has a neck 17 having an opening 49 and a container body 51, which is connected to neck 17. Container body 51 on the bottom transforms into a convex, inwardly curved foot area 53, at which an annular edge portion 55 connects, serving as a standing surface for plastic bottle 11. Edge portion 55 has a curvature 57 (FIGS. 6 through 8), which transitions on the inside into container bottom 47, as is easily visible from FIG. 9. In container body 47, concave areas 59 are separated from one another by radially extending material beads 61. FIG. 6 shows concave areas 59 and material beads 61 behind them having an outwardly cambered (convex) back 62. In the middle of container bottom 47 is a radial, outwardly cambered area 63, in which center is an injection point 65 of preform 15. Area 63 is separated from concave area 59 by a first groove-shaped recess 67. A second groove-shaped recess 69 is provided between edge portion 55 and concave areas 59. Small ring sections 71, 73 are respectively provided between material beads 61 and groove-shaped recesses 67, 69. Ring sections 71, 73 may be each less than 2 mm or less than 1 mm wide (viewed in radial direction).

Figure 9:
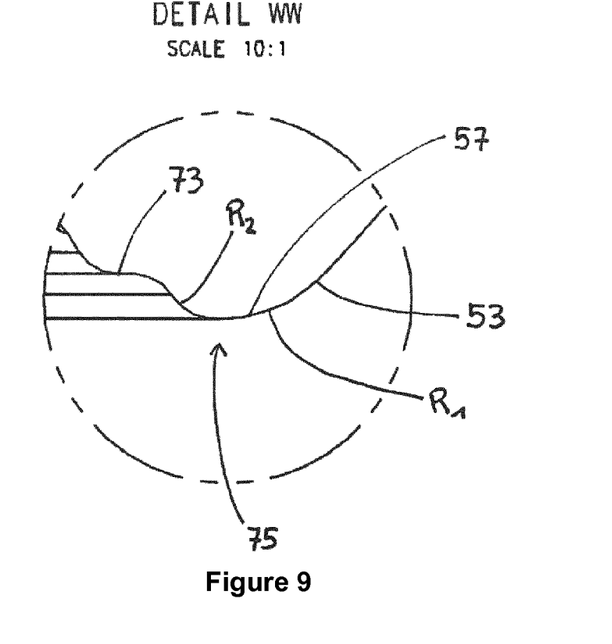
FIG. 9 shows a detailed view of a standing surface of the plastic container from FIG. 4.
Figure 10:
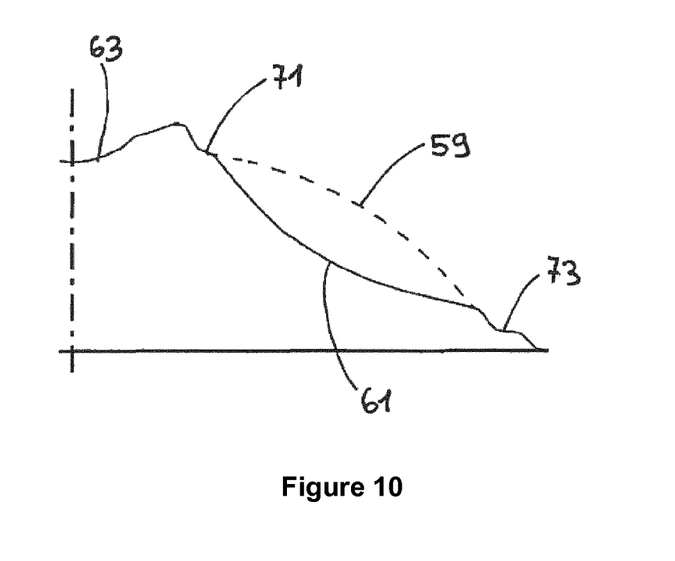
FIG. 10 shows a detailed view of the material bead.
Figure 11:
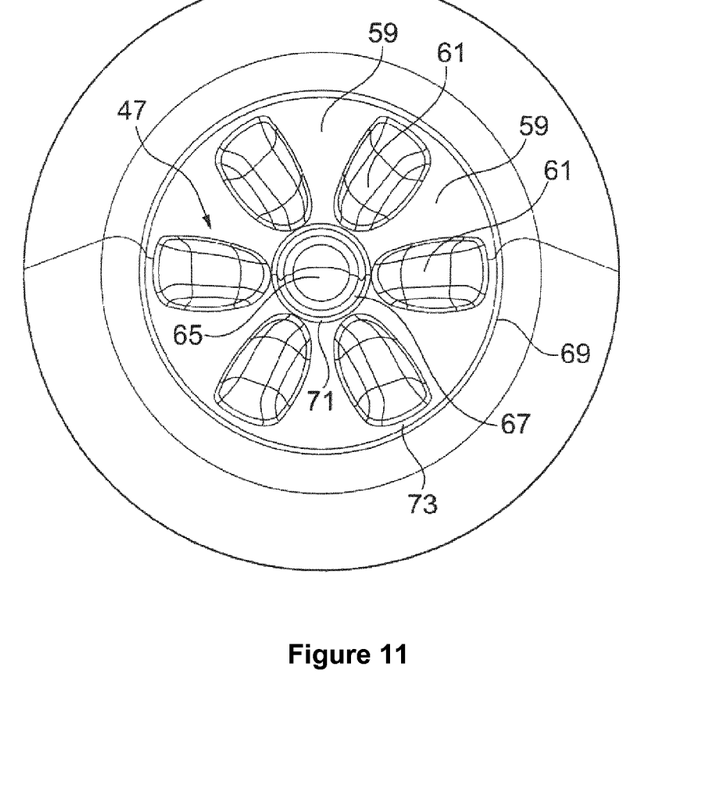
FIG. 11 shows a bottom view of the suggested container bottom.

As is in particular evident from the detailed view according to FIG. 9, convex, inwardly curved foot area 53 of a plastic bottle 11 substantially formed in a circular cylindrical manner and neighboring an annular standing surface 75, which extends perpendicular to the container axis, has a radius $R_1$, and concave container bottom 47 adjacent to annular standing surface 47 has a radius $R_2$, and the radius $R_1$ is at least twice as great as radius $R_2$.

For the production of suggested plastic bottles 11, a PET may be used, having an intrinsic viscosity between 0.83 and 1.3 dl/g and a copolymer containing by weight between 2% and 10%, containing by weight between 4% and 6% or containing by weight between 4.5% and 5.5%. The intrinsic viscosity is measured according to ISO 1628T5. Solvent is the mixture Phenol/1.2 dichlorobenzene having a mixing ratio of 1:1. The measuring temperature is 25° C.

For the production of the initial polymer, diethylene glycol may be in part used in place of monoethylene glycol. Also, isophthalic acid may be partially used in place of terephthalic acid. In doing so, a polymer results that crystallizes less and enables preforms having thicker walls, which otherwise would crystallize, typically because of a cooling occurring too slow, in the injection tools at wall thicknesses of 4.4 mm.

For the production of a plastic bottle stable under pressure, a preform having a wall thickness of at least 4 mm is used, which bottom is thickened gradually or in one or a plurality of steps and, in this instance, may have a wall thickness of above 4.4 mm, or a wall thickness between 5.5 and 6.5 mm.

What is claimed is:

1. A method for producing a blow-molded plastic container starting from a preform, comprising:
providing a preform comprising a neck and a preform body, the preform body having a first wall section and a second wall section adjacent to and integrally formed with the first wall section, the preform body connected to the neck of the preform below a protruding ring attached to the neck, the first and second wall sections of the preform body defining an outer surface of the preform body that extends from the neck to a bottom of the preform body, the outer surface having an outer diameter that only transitions in decreasing diameter along the outside surface of the preform body from below the protruding ring to a bottom of the preform body as the outer surface transitions in a direction from the neck to the bottom of the preform body, and the preform body defining an inner surface having an inner diameter that only transitions in decreasing diameter along the inside surface of the preform body as the inner surface transitions in a direction from the neck to the bottom of the preform;
providing a blow mold defining a cavity and at least one groove at a to-be-reinforced location of a plastic container to be formed within the blow mold;
heating the preform body by application of a temperature profile corresponding to a wall thickness distribution of the preform in such a manner that the first wall section correlating with the at least one groove of the cavity is heated to a lesser amount than the second wall section and is thereby cooler and thinned to a lesser extent when stretching and/or pre-blowing than the second wall section;
transferring the preform with the heated preform body into the cavity of the blow mold;
pre-blowing and/or stretching the heated preform body to a pre-blow;
main-blowing the pre-blow to form the plastic container; and
affecting an accumulation of plastic material by the first wall section in the at least one groove during the main-blowing.

2. The method of claim 1, further comprising providing the preform body wherein an inside surface of the preform body opposite of the outside surface of the preform body is also devoid of protrusions and undercuts.

3. The method of claim 1, further comprising working the at least one groove into the cavity, wherein the at least one groove has a maximum width of one of 10 mm, 7 mm and 5 mm.

4. The method of claim 1, further comprising providing the at least one groove with a maximum width of one of 6 mm, 5 mm or 4 mm.

5. The method of claim 1, further comprising forming an increase of the wall thickness between the inside and the outside of the preform body along a middle axis of the preform body at an increasing distance from a transfer ring adjacent to the preform body.

* * * * *